US011943850B2

(12) United States Patent
Hontele et al.

(10) Patent No.: US 11,943,850 B2
(45) Date of Patent: Mar. 26, 2024

(54) CURRENT DRIVER AND DRIVING METHOD

(71) Applicant: SIGNIFY HOLDING B.V., Eindhoven (NL)

(72) Inventors: Bertrand Johan Edward Hontele, Breda (NL); Theo Gerrit Zijlman, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/619,708

(22) PCT Filed: Jun. 19, 2020

(86) PCT No.: PCT/EP2020/067075
§ 371 (c)(1),
(2) Date: Dec. 16, 2021

(87) PCT Pub. No.: WO2020/260147
PCT Pub. Date: Dec. 30, 2020

(65) Prior Publication Data

US 2022/0312562 A1 Sep. 29, 2022

(30) Foreign Application Priority Data

Jun. 25, 2019 (EP) .................................... 19182170

(51) Int. Cl.
*H05B 45/37* (2020.01)
*H05B 45/325* (2020.01)

(52) U.S. Cl.
CPC ........... *H05B 45/37* (2020.01); *H05B 45/325* (2020.01)

(58) Field of Classification Search
CPC ...... H05B 45/37; H05B 45/325; H05B 45/59; H05B 45/00
See application file for complete search history.

(56) References Cited

U.S. PATENT DOCUMENTS

| | | | | |
|---|---|---|---|---|
| 2011/0309759 | A1* | 12/2011 | Shteynberg | H05B 45/3575 315/201 |
| 2015/0289325 | A1 | 10/2015 | Szolusha | |
| 2017/0208660 | A1 | 7/2017 | Hilgers et al. | |
| 2017/0265260 | A1* | 9/2017 | Briggs | H05B 45/46 |
| 2017/0265266 | A1* | 9/2017 | Murray | H05B 45/10 |
| 2018/0070419 | A1* | 3/2018 | Girard | H05B 47/195 |

FOREIGN PATENT DOCUMENTS

| | | | |
|---|---|---|---|
| JP | 2012227075 | A | 11/2012 |
| JP | 201888789 | A | 6/2018 |
| JP | 2018088789 | A | 6/2018 |
| WO | 2019020560 | A1 | 1/2019 |

* cited by examiner

*Primary Examiner* — Minh D A

(57) ABSTRACT

A LED circuit comprises a current drive circuit for driving a current through the parallel combination of a LED arrangement and an output capacitor. An override arrangement overrides the current level setting to a default current level during start-up, and the override arrangement is disabled when a current flow is sensed by a sensor. The current setting of the driver is ignored until a threshold current is sensed through the LED arrangement. The delay associated with initial start-up charging of the output capacitor is thereby avoided.

10 Claims, 2 Drawing Sheets

CURRENT DRIVER AND DRIVING METHOD

CROSS-REFERENCE TO PRIOR APPLICATIONS

This application is the U.S. National Phase application under 35 U.S.C. § 371 of International Application No. PCT/EP2020/067075, filed on Jun. 19, 2020, which claims the benefit of European Patent Application No. 19182170.1, filed on Jun. 25, 2019. These applications are hereby incorporated by reference herein.

FIELD OF THE INVENTION

This invention relates to current driver circuits, for example for driving a LED lighting load.

BACKGROUND OF THE INVENTION

To minimize cost, it is desirable to use a single stage, high power factor LED driver. The high power factor relies on the presence of an output capacitor to reduce the amount of mains-frequency current ripple.

To control the average output current used to drive the LEDs, a feedback circuit is typically used, which measures the combined output capacitor and LED current. This applies both to single stage switch mode power supplies and linear drivers.

Switch mode power supplies incorporate a switching regulator to convert electrical power efficiently for transfer to a DC loads. The switching regulator continually switches between full-on and full-off states which minimizes wasted energy. Voltage or current regulation is achieved by varying the duty cycle of the switching regulator. In contrast, linear drivers regulate the output voltage or current by continually dissipating power. They are therefore less power efficient, but unlike switch mode power supplies, they do not contain high-frequency switching elements that deteriorate the electromagnetic interference (EMI) performance of the driver.

The value of the output capacitor (typically an electrolytic capacitor) depends on the amount of required ripple reduction and the dynamic resistance of the LEDs. The more the reduction that is needed, the bigger the capacitor needs to be.

A large output capacitor takes a significant time to charge at power-on. Especially if the required output current is a set to a low dimming value (e.g. 2% of full current), the charging time of the output capacitor before any light is produced can take up to several seconds.

It would be desirable to reduce this time delay, but without adding significant complexity to the driver circuit.

SUMMARY OF THE INVENTION

The invention is defined by the claims.

According to examples in accordance with an aspect of the invention, there is provided a LED circuit, comprising:

a current drive circuit;

a LED arrangement;

an output capacitor in parallel with the LED arrangement, wherein the current drive circuit is adapted to drive a current through the parallel combination of the LED arrangement and the output capacitor;

a control signal for setting the current level delivered by the current drive circuit;

a sensor for sensing when current flows through the LED arrangement; and an override arrangement for overriding the current level setting of the control signal to a default current level, wherein the LED circuit is adapted to deactivate the override arrangement in response to sensing by the sensor.

This LED circuit has an override arrangement which ignores the current setting of the driver until a threshold current is sensed through the LED arrangement. In this way, the current level of the current drive circuit can be set to a high level while the parallel output capacitor charges. The current drive circuit can revert to the desired current level as soon as a small current is flowing through the LED arrangement itself, thus avoiding overdriving the LED arrangement, or creating flashes. However, the delay associated with initial start-up charging of the output capacitor (with no light output, or a light output below a minimum level corresponding to maximum dimming) is avoided.

The sensing of when current flows may be based on sensing the actual current or based on sensing a light output from an opto-coupler or from LED arrangement itself, resulting from a flowing current.

Sensing when current flows may be based on detection of a threshold current or a corresponding amount of light output.

The default current level is for example a maximum current level setting. Thus, the output capacitor is charged as quickly as possible.

The sensor for example comprises a current sense resistor in series with the LED arrangement. This provides a simple way to monitor the LED current alone. The resistor may be external to the main driver IC, but equally it may be incorporated within the driver IC.

A deactivating switch may be provided for deactivating the override arrangement, wherein a control terminal voltage of the switch is set by the sensor, for example the voltage across the current sense resistor. Thus, it is turned on and off in dependence on the LED current flowing. In one example, it is turned off during start-up. When a sufficient current flows so it is turned on, the override function is deactivated, and normal current control resumes.

A capacitor is preferably in parallel with the current sense resistor. This stores the gate terminal voltage.

The control signal preferably has a pulse width modulation profile, wherein the duty cycle of the pulse width modulation profile defines the current level, and the override arrangement is for implementing an OR function between the control signal and an override signal before application to the current drive circuit.

The override signal then means the result of the OR function is such that the current drive circuit is driven to its maximum level. The override signal is for example a DC signal at or above the high voltage level of the PWM signal.

In one example, the override arrangement comprises a circuit having a pull up transistor for pulling up the control signal to a default voltage (e.g. equal or higher than the PWM high voltage) when turned on, and isolating the default voltage from the control signal when turned off.

The default voltage thus overrides the normal current control signal.

The deactivating switch, when turned on, turns off the pull up transistor. This allows the control signal to operate without being overridden.

The current drive circuit for example comprises a linear current source. This provides a low cost implementation.

The circuit preferably has a mains input and a rectifier, wherein the rectifier output is provided to the current drive circuit, LED arrangement and output capacitor.

The invention also provides a LED driving method, comprising:

receiving a current level setting;

during start-up, overriding the current level setting to a default current level;

driving the default current level through a parallel combination of a LED arrangement and an output capacitor;

sensing when a current flows through the LED arrangement;

deactivating the override function in response to the sensing; and after deactivation, driving the received current level setting through the parallel combination of the LED arrangement and the output capacitor.

This method avoids the initial delay at start-up of the circuit, associated with charging of the output capacitor.

The default current level is for example a maximum current level setting.

Sensing a current for example comprises deriving a voltage across a current sense resistor in series with the LED arrangement.

The overriding for example comprises implementing an OR function between the current level setting and an override signal. The override signal results in the default current level being set.

The overriding may comprise pulling up a control signal which defines the current level setting to a default voltage. The control signal for example has a pulse width modulation profile when the overriding is deactivated, wherein the duty cycle of the pulse width modulation profile defines the current level.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
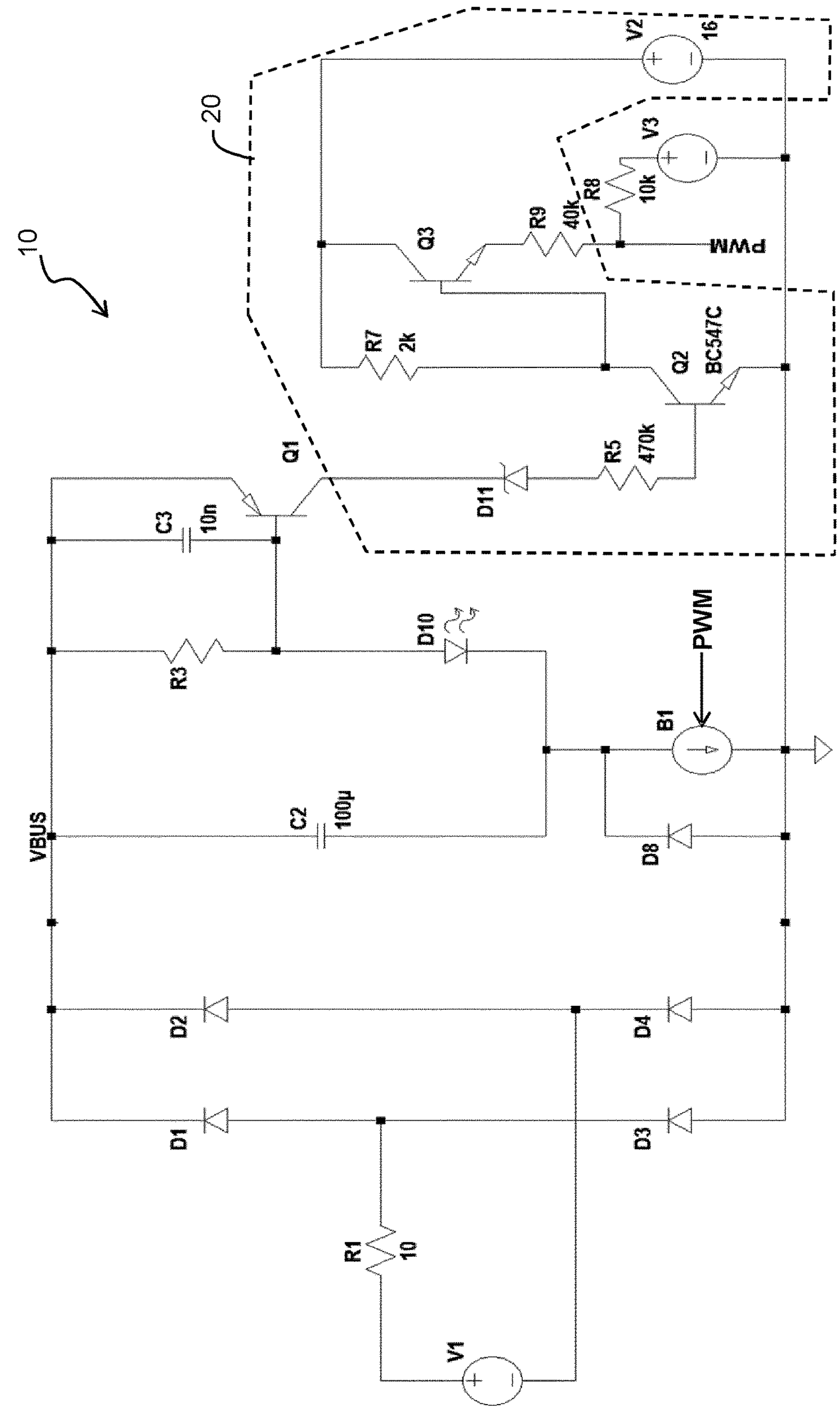
FIG. 1 shows one example of a LED circuit in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a LED circuit which comprises a current drive circuit for driving a current through the parallel combination of a LED arrangement and an output capacitor. An override arrangement overrides the current level setting to a default current level during start-up, and the override arrangement is disabled when a current flow is sensed (directly or indirectly) by a sensor. The current setting of the driver is ignored until a threshold current is sensed through the LED arrangement. The delay associated with initial start-up charging of the output capacitor is thereby avoided.

FIG. 1 shows one example of a LED circuit 10 in accordance with the invention.

The circuit 10 comprises a mains input, represented by voltage source V1. A resistor R1 is provided downstream of the input, and is an inrush current limiting resistor that also acts as a fuse.

The mains input connects to a full bridge rectifier of diodes D1 to D4. The rectifier output is a bus (or line) voltage VBUS.

The rectifier output is also provided to a series circuit comprising a current drive circuit B1 and a parallel combination of a LED arrangement D10 and an output capacitor C2. The capacitor C2 is a large (e.g. 100 uF) electrolytic capacitor for smoothing the rectified output. The current drive circuit is adapted to drive a current through the parallel combination of the LED arrangement D10 and the output capacitor C2. The LED arrangement may be a series arrangement of LEDs or indeed multiple parallel branches of LEDs.

A control signal PWM is used for setting the current level delivered by the current drive circuit B1.

The average current of current source B1 is regulated by the PWM signal.

Depending on the implementation of the current source, the current shape is either a constant current, or a shaped current waveform, to limit the losses in the current source B1. A high voltage across B1 will lead to a lower instantaneous current setting of B1, while keeping the average value at the preset level.

A Zener diode D8 is in parallel with the current source, to absorb the high voltage between two the transistors Q1 and Q2 (which are discussed further below). This potentially allows use of a lower voltage rating (Vce) of the transistor Q1 hence a lower cost.

The current through the LED arrangement D10 is measured using a current sensor, in particular a current sense resistor R3. The current sensor R3 is placed in series with the LED arrangement D10 and the series arrangement of the current sensor R3 and the LED arrangement D10 is placed in parallel with the output capacitor C2. The current sensor R3 may be placed such that only the current flowing through the LED arrangement D10 is sensed.

Based on the current flowing through the LED arrangement D10, a user-defined current level may be implemented by the current drive circuit B1, for example for achieving a user-selected dimming level setting, or else this setting may be overridden to allow more current to flow and hence charge the output capacitor C2 more quickly. This overriding takes place during start-up of the circuit.

For this purpose, there is an override arrangement 20 for overriding the current level setting to a default current level. The override arrangement 20 either forces the current drive circuit B1 to deliver a default, e.g. maximum, current (thereby overriding the user setting of the current level) or else it allows the user current setting to be used.

A deactivating switch Q1 is provided for deactivating the override arrangement 20 when a threshold current is sensed by the current sensor R3. Thus, until a sufficient current flows through the LED arrangement, the override arrangement 20 is active.

The LED circuit D10 thus has an override arrangement 20 which ignores the current setting of the driver until a threshold current is sensed through the LED arrangement D10. In this way, the current level of the current drive circuit B1 can be set to a high level while the parallel output capacitor C2 charges. The current drive circuit B1 reverts to the user-selected current level as soon as a small current is flowing through the LED arrangement D10 itself, thus avoiding overdriving the LED arrangement D10, or creating flashes. However, the delay associated with initial start-up charging of the output capacitor C2 is minimized to approximately the same time as the delay in the full light output startup.

The threshold current is for example smaller than the minimum dimming level (of 2%) by a factor of 5 to 20. This means the threshold current may be between 0.1%)=0.02/20) to 0.4% (0.02/5) of the full output current.

This will lead to a relatively high ohmic resistor R3, but the total voltage drop across resistor R3 will never exceed the base emitter voltage Vbe of Q1, once this is fully on.

The expected voltage across resistor R3 will clip around 0.7V and the current will primarily flow through the emitter-base diode of transistor Q1. This will minimize the losses in the current measurement circuit R3.

The transistor Q1 is more generally a deactivating switch. The control gate (base) terminal voltage is set by the voltage across the current sense resistor R3. In the example shown, it is turned off during start-up. As the current increases, the base voltage is pulled down (by the increasing voltage drop across R3) until at a certain current, the pnp transistor turns on. The override function is then deactivated in the manner explained below, and normal current control resumes. A capacitor C3 in parallel with the current sense resistor R3 stores the base voltage.

The override arrangement 20 for example comprises a circuit which receives the control signal PWM as an input, as shown. The control signal PWM is generated by a (typically wireless controlled) microcontroller unit (MCU). It may be an RF MCU using Zigbee, or infrared or WiFi communication, for example.

The source of the control signal PWM is represented in FIG. 1 as a voltage source V3. Normally, the control signal would be provided to the current drive circuit B1 directly. The invention provides the additional override arrangement.

The override arrangement 20 in the example shown has a pull up transistor Q3 for pulling up the control signal PWM to a default voltage V2 (through resistor R9) when turned on, and isolating the default voltage V2 from the control signal when turned off.

The default voltage V2 thus overrides the normal current control signal.

The resistor R9 is part of a resistor divider R8, R9 between the pull up transistor Q3 and the voltage source V3.

For example the output from the voltage source V3 may be a PWM signal between 0V and 3.3V (i.e. the voltage rails of the controller IC). V2 may be a constant voltage of 16V.

Thus, when Q3 is off, the control signal is a 0V to 3.3V PWM signal. When Q3 is on, the voltage divider of R8 and R9 means the control signal PWM is either 3.2V (when V3=0) or 5.8V (when V3=3.3V). Both of these correspond to a maximum drive current when applied to the current drive circuit.

The current drive circuit reacts in the same way to a 3.2V input as to a 5.8V input.

The control signal PWM thus has a pulse width modulation profile when the pull up transistor is turned off, and the duty cycle of the pulse width modulation profile defines the current level.

Initially, the deactivating switch Q1 is turned off. The transistor Q2 is off, and the base of Q3 is pulled high through base resistor R7.

The deactivating switch Q1, when turned on, turns off the pull up transistor Q3. This allows the control signal to operate without being overridden. In particular, when Q1 is turned on, Q2 is turned on because a current is delivered to the base through Q1, and through the Zener diode D11 and resistor R5. Q2 in turn pulls down the base of Q3, turning it off.

It can be seen that the function of the override arrangement is to implement an OR function between the control signal and an override signal (i.e. the voltage source V2 when fed through transistor Q3). This OR function takes place before application of the current setting signal to the current drive circuit.

The PWM signal may for example be for setting a very low current, corresponding to a low dimming level of 2-5%. However, initially, the current drive circuit may deliver a 100% current level, until a small threshold current starts flowing through the LED arrangement.

Note that FIG. 1 is just one example of an implementation. Some or all of the circuits may be integrated into the current drive circuit. The current sensing may be performed internally of the drive IC or externally. In an IC implementation, the current sensing can be done as well in different ways. For example, the analog circuitry with Q2 and Q3 can be replaced with a logic circuit, in which the override signal forces the PWM to a logical 1 in similar manner to that explained above.

Q1 needs to have sufficient voltage rating (combined with D11), which relates to a certain amount of cost. The aim of the invention is to stop quick-charging as soon as a current starts to flow through the LEDs.

Direct sensing of the LED current by means of resistor R3 is only one option. An alternative is to place the LED side of an optocoupler in series with the LEDs, the detection current can then activate the output transistor of the optocoupler directly, with the same functionality as Q2. This is an alternative implementation of the sensing circuit. This option uses generation and detection of light. A further alternative is to implement detection of the light from the LED arrangement using a photodiode or phototransistor.

In these cases, the sensor for sensing that current flows through the LED makes use of an optical sensor which senses light caused by the current flow, rather than detecting the current directly.

Some component values are shown in FIG. 1. These are simply to provide an example of orders of magnitude and are not intended to be limiting in any way.

Figure 2:
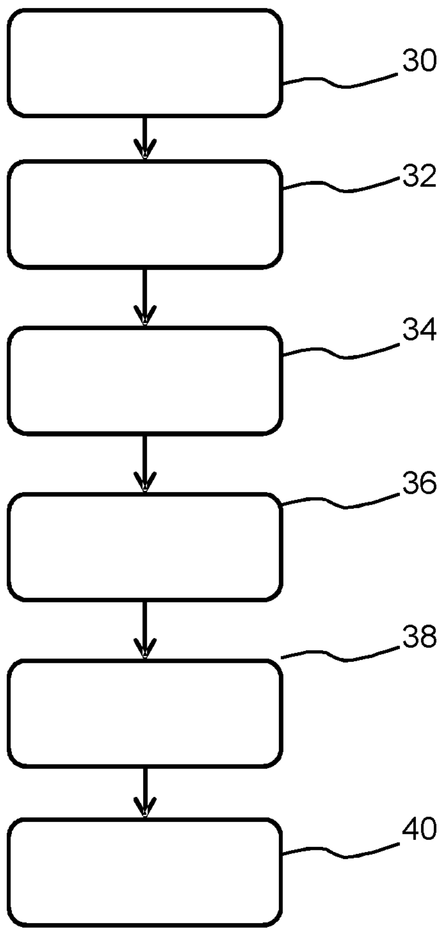
FIG. 2 shows a flow diagram of a LED driving method.

FIG. 2 shows a LED driving method, comprising:

in step 30, receiving a current level setting;

in step 32, during start-up, overriding the current level setting to a default current level;

in step 34, driving the default current level through a parallel combination of the LED arrangement D10 and the output capacitor C2;

in step 36, sensing when a current flows through the LED arrangement;

in step 38, deactivating the override function in response to the sensing; and in step 40, after deactivation, driving the received current level setting. through the parallel combination of the LED arrangement D10 and the output capacitor C2.

Sensing when a current flows may involve sensing when a particular threshold current flows, either directly or based on optical sensing of a corresponding light output.

This method avoids the initial delay at start-up of the circuit, associated with charging of the output capacitor.

The example above is based on a linear current driver. However, the invention may be applied to drivers which make use of switch mode power supplies as well.

The example above is based on an analog override circuit and deactivating switch. However, the LED current may be sensed (as the voltage across the current sense resistor) and the signal may then be provided to a signal processor instead of a deactivating switch, which then implements all of the functions explained above digitally.

The invention is of interest generally for linear drivers for LED lamps (IC based or with discrete components), or SMPS drivers, such as IC driver circuits, independent of the topology.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A LED circuit, comprising:

a current drive circuit;

an LED arrangement;

a current sensor for sensing when current flows through the LED arrangement, wherein the current sensor is coupled in series with the LED arrangement and wherein the series arrangement of the current sensor and the LED arrangement is coupled in parallel with an output capacitor;

the output capacitor, wherein the current drive circuit is adapted to drive a current through the LED arrangement, the current sensor and the output capacitor;

a control signal for setting the current level delivered by the current drive circuit;

an override arrangement for overriding the current level setting of the control signal to a default current level; and a deactivating transistor for deactivating the override arrangement, wherein a control terminal voltage of the transistor is set by the sensor, wherein the LED circuit is adapted to deactivate the override arrangement in response to the sensed current by the current sensor exceeding a threshold current, wherein the default current level is a maximum current level setting, wherein the override arrangement comprises a circuit having a pull up transistor for pulling up the control signal to a default voltage when turned on, and isolating the default voltage from the control signal when turned off, and wherein the deactivating transistor when turned on, turns off the pull up transistor.

2. The LED circuit as claimed in claim 1, wherein the current sensor comprises a current sense resistor in series with the LED arrangement, and wherein the current sense resistor is coupled to a base of the deactivating transistor.

3. The LED circuit as claimed in claim 2, comprising a further capacitor in parallel with the current sense resistor.

4. The LED as claimed in claim 1, wherein the control signal has a pulse width modulation profile, wherein the duty cycle of the pulse width modulation profile defines the current level, and the override arrangement is for implementing an OR function between the control signal and an override signal, before application to the current drive circuit.

5. The LED circuit as claimed in claim 1, wherein the current drive circuit comprises a linear current source.

6. The LED circuit as claimed in claim 1, comprising a mains input and a rectifier, wherein the rectifier output is provided to the current drive circuit, LED arrangement and output capacitor.

7. An LED driving method, comprising:

receiving a current level setting;

during start-up, overriding, via an override arrangement, the current level setting to a default current level;

driving the default current level through a parallel combination of an LED arrangement and an output capacitor;

sensing using a current sensor to indicate when current flows through the LED arrangement;

deactivating, via a deactivating transistor, the override function in response to the sensing wherein a control terminal voltage of the transistor is set by the sensor; and after deactivation, driving the received current level setting through the parallel combination of the LED arrangement and the output capacitor, wherein the current sensor is coupled in series with the LED arrangement and wherein the series arrangement of the current sensor and the LED arrangement is coupled in parallel with an output capacitor wherein the default current level is a maximum current level setting wherein the override arrangement comprises a circuit having a pull up transistor for pulling up the control signal to a default voltage when turned on, and isolating the default voltage from the control signal when turned off, and wherein the deactivating transistor when turned on, turns off the pull up transistor.

8. The method as claimed in claim 7, wherein sensing a current comprises deriving a voltage across a current sense resistor in series with the LED arrangement and wherein the current sense resistor is coupled to a base of the deactivating transistor.

9. The method as claimed in claim 7, wherein the overriding comprises implementing an OR function between the current level setting and an override signal.

10. The method as claimed in claim 9, wherein the control signal has a pulse width modulation profile when the overriding is deactivated, wherein the duty cycle of the pulse width modulation profile defines the current level.

* * * * *